United States Patent [19]

Bargain et al.

[11] E Re. 29,316

[45] Reissued July 19, 1977

[54] CROSS-LINKED RESINS

[75] Inventors: Michel Bargain; André Combet, both of Lyon; Pierre Grosjean, Sainte-Foyte-les-Lyon, all of France

[73] Assignee: Rhone-Poulenc S.A., Paris, France

[21] Appl. No.: 311,138

[22] Filed: Dec. 1, 1972

Related U.S. Patent Documents

Reissue of:

[64] Patent No.: 3,562,223
Issued: Feb. 9, 1971
Appl. No.: 743,025
Filed: July 8, 1968

[30] Foreign Application Priority Data

July 13, 1967 France ..... 67.114381

[51] Int. Cl.[2] ..... C08G 73/12

[52] U.S. Cl. ..... 260/30.2; 260/32.6 N; 260/47 UA; 260/47 CZ; 260/47 CP; 260/78 UA; 260/78 TP; 428/435; 428/474

[58] Field of Search ..... 260/47 CP, 78 UA, 30.2, 260/32.6 N, 47 UA, 47 CZ

[56] References Cited

U.S. PATENT DOCUMENTS

| | | | |
|---|---|---|---|
| 2,818,405 | 12/1957 | Kovacic | 260/78 |
| 3,380,964 | 4/1968 | Grundschober et al. | 260/47 |
| 3,625,912 | 12/1971 | Vincent | 260/30.2 |

*Primary Examiner*—Lester L. Lee
*Attorney, Agent, or Firm*—Bacon & Thomas

[57] ABSTRACT

Cross-linked resins of good thermal stability useful inter alia for making multicellular materials, for bonding metals, and for making laminates and moulded articles are made by reacting, e.g. by heating together, an unsaturated bis-imide with a diprimary diamine in a ratio of 1.2:1 to 50:1.

21 Claims, No Drawings

CROSS-LINKED RESINS

Matter enclosed in heavy brackets [ ] appears in the original patent but forms no part of this reissue specification; matter printed in italics indicates the additions made by reissue.

This invention relates to cross-linked resins of good thermal stability and their production.

French Pat. No. 1,455,514 describes three-dimensional polyimides prepared by heating N,N'-bis-imides of unsaturated carboxylic acids, e.g. maleic N,N'-metaphenylene-bis-imide. These polyimides are infusible and insoluble resins whose decomposition temperature is high, but moulded objects made of them often undergo deformations on the surface in the course of prolonged use at temperatures in the neighbourhood of 200° C. or above.

It has also been proposed (see U.S. Pat. No. 2,818,405) to prepare linear elastomers by coupling liquid diprimary diamines having an optionally halogenated aliphatic chain and a molecular weight from 750 to 12,000, with a bis-maleimide. These elastomers may be converted into elastic films or filaments, but are obviously less well adapted to the production of compact moulded articles, while in addition they have low thermal stability.

It has now been found, and this forms the subject of the present invention, that new cross-linked resins resistant to severe thermal stresses are obtained when an N,N'-bis-imide of an unsaturated dicarboxylic acid of the formula:

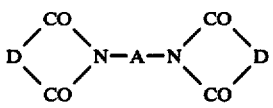

(I)

in which D represents a divalent radical containing a carbon-carbon double bond and A is a divalent radical having at least 2 carbon atoms, is reacted with a diamine of the formula:

$$H_2N—B—NH_2 \quad \text{(II)}$$

in which B represents a divalent radical not having more than 30 carbon atoms, in a ratio of bis-imide to diamine of between 1.2:1 and 50:1.

The symbols A and B may be identical or different and may represent linear or branched alkylene radicals having less than 13 carbon atoms, cycloalkylene radicals having 5 or 6 carbon atoms in the ring, heterocyclic radicals containing at least one of the atoms O, N and S, or a phenylene or polycyclic aromatic radical. These various radicals may carry substituents which do not give undesired side-reactions under the operating conditions. The symbols A and B may also represent a number of phenylene or alicyclic radicals connected directly or by a divalent atom or group such as, for example, oxygen or sulphur, an alkylene grouping of 1 to 3 carbon atoms, or one of the groups $—NR_4—$, $—P(O)R_3—$, $—N=N—$,

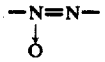

$—CO—O—$, $—SO_2—$, $SiR_3R_4—$, $—CONH—$

-continued $—NY—CO—X—CO—NY—$ $—O—CO—X—CO—O—$

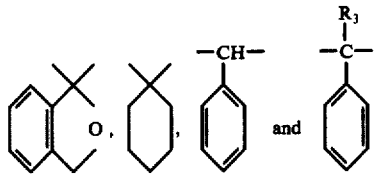

in which $R_3$, $R_4$ and Y each represent alkyl of 1 to 4 carbon atoms, or a cycloalkyl radical having 5 or 6 carbon atoms in the ring, or a phenyl or polycyclic aromatic radical, and X represents a straight or branched alkylene radical having less than 13 carbon atoms, a cycloalkylene radical having 5 or 6 carbon atoms in the ring, or a mono- or polycyclic arylene radical.

The radical D is derived from an ethylenic anhydride of the formula:

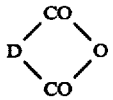

(III)

which may be, for example, maleic anhydride, citraconic anhydride, tetrahydrophthalic anhydride, itaconic anhydride and the products of Diels-Alder reaction between a cyclodiene and one of these anhydrides.

Preferred N,N'-bis-imides of Formula I which may be employed, are maleic N,N'-ethylene-bis-imide, maleic N,N'-hexamethylene-bis-imide, maleic N,N'-metaphenylene-bis-imide, maleic N,N'-paraphenylene-bis-imide, maleic N,N'-4,4'-diphenylmethane-bis-imide, maleic N,N'-4,4'-diphenylether-bis-imide, maleic N,N'-4,4'-diphenylsulphone-bis-imide, maleic N,N'-4,4'-dicyclohexylmethane-bis-imide, maleic N,N'-α,α'-4,4'-dimethylenecyclohexane-bis-imide, maleic N,N'-metaxylylene-bis-imide, and maleic N,N'-4,4'-diphenylcyclohexane-bis-imide.

Examples of diamines of Formula II which may be employed, are 4,4'-diaminodicyclohexylmethane, 1,4-diaminocyclohexane, 2,6-diaminopyridine, metaphenylenediamine, paraphenylenediamine, 4,4'-diaminodiphenylmethane, 2,2-bis-(4-aminophenyl)propane, benzidine, 4,4'-diaminophenyl oxide, 4,4'-diaminodiphenyl sulphide, 4,4'-diaminodiphenylsulphone, bis-(4-aminophenyl)diphenylsilane, bis-(4-aminophenyl)methylphosphine oxide, bis-(3-aminophenyl)methylphosphine oxide, bis-(4-aminophenyl)phenylphosphine oxide, bis-(4-aminophenyl)phenylamine, 1,5-diaminonaphthalene, metaxylylenediamine, paraxylylene diamine, 1,1-bis-(paraaminophenyl)phthalene, and hexamethylenediamine.

The quantities of N,N'-bis-imide and of diamine are chosen in such manner that the ratio $$\frac{\text{Number of moles of N,N'-bis-imide}}{\text{Number of moles of diamine}}$$

is between 1.2:1 and 50:1, preferably between 1.3:1 and 5:1.

The preparation of the new resins of the invention may be carried out in an inert polar diluent such as dimethylformamide, N-methylpyrrolidone or dimethylacetamide. A solvent is advantageously used when the application of the polymer formed necessitates the use of a solution, because it makes it possible to obtain directly solutions whose solids content may be very high.

The preparation may also be carried out in bulk, by heating the reactants which have previously been intimately mixed. Depending upon the physical state of the reactants, conventional methods may be employed for mixing finely divided solids, or a solution or a dispersion of one of the reactants in the other, maintained in the liquid state, may be prepared. For many uses, it is advantageous, first to heat the mixture of the two reactants at a moderate temperature of the order of 100° to 250° C. for a few minutes to a few hours. The prepolymer thus obtained may then be employed in solution in a solvent such as those referred to above or in suspension in an inert diluent, or it may be shaped by simple hot casting, or again it may be employed as powder. In a second phase, the hardening of the prepolymer may be directly effected by heating to temperatures of the order of 350° C., optionally under pressure.

The mixture may also be directly brought into the form of the desired article and the hardening may be effected by heating, optionally under pressure.

The new resins are infusible and insoluble. They have remarkable resistance to thermal stresses, have good dielectric properties and are endowed with excellent stability to chemical agents. They may be converted into multicellular materials or employed for bonding metals. They are also particularly useful for the preparation of laminates based on mineral fibres or of moulded articles optionally in association with fibrous or pulverulent fillers.

The following examples illustrate the invention. In these examples, the tests are carried out in accordance with the following standards:

Flexural test standard A.S.T.M. D790-63, the spans being specified in each example.

Tensile strength test: Standard A.S.T.M. D882-61T.

Dielectric strength test: Standard A.S.T.M. D150-69T.

EXAMPLE 1

77.5 g. of maleic N,N'-4,4'-diphenylmethane-bis-imide are added to 33 g. of bis-(4-aminophenyl)methane previously heated to 125° C. The mixture is stirred, maintained at 125° C. for 10 minutes and then run into a parallelepipedic mould (125 mm. × 6 mm. × 75 mm.) heated at 200° C. The whole is maintained at 200° C. for 3 hours. After mould release, the plate is cut into test pieces (length 37.5 mm., width 9.57 mm.) which have at 25° C. a flexural strength of 15.3 kg./mm.$^2$ for a span of 25.4 mm.

After heating at 250° C. for 910 hours, the strength is still 10.6 kg./mm.$^2$.

EXAMPLE 2

A homogeneous mixture is prepared from identical quantities of the same reactants as in Example 1. This mixture is spread on the plane surface of an open metal receptacle to form a layer about 1 cm. thick, and the whole is kept for 7 minutes in an oven heated at 200° C. After cooling and mould release, the product obtained is finely ground (mean diameter of the particles 80μ) and 25 g. thereof are introduced into a cylindrical mould (diameter 75 mm.). The mould is introduced between the plates of a press heated at 200° C. and a pressure of 50 kg./cm.$^2$ is applied. These conditions are maintained for 1 hour. After mould release at elevated temperature, the object is further heated at 220° C. for 24 hours and then at 240° C. for 24 hours. After cooling, it has, at 25° C., a flexural strength of 12.1 kg./mm.$^2$.

After 1650 hours at 250° C., this strength is still 11.9 kg./mm.$^2$ (for a span of 25.4 mm.).

EXAMPLE 3

The procedure of Example 1 is followed, starting with 33 g. of the same diamine and 89.5 g. of the same bis-imide, the mixture being heated at 120° C. for 10 minutes.

(a) A portion of the hot liquid mixture is run into cylindrical moulds (diameter 54 mm., height 6 mm.); the hardening is effected by heating at 200° C. for 2 hours and is followed by an additional heat treatment for 15 hours at the same temperature. The moulded bodies have the following characteristics at 25° C.:

| | Initial | After 113 hours at 250° C. |
|---|---|---|
| Dielectric constant at 50 c./s | 3.8 | 3.5 |
| Tangent δ | $2 \times 10^{-3}$ | $<10^{-3}$ |
| Transverse resistivity, ohm-cm | $2 \times 10^{14}$ | $2 \times 10^{15}$ |

(b) Another portion of the hot liquid mixture is run into the parallelepipedic mould described in Example 1, preheated at 120° C. The whole is heated to 200° C. in 30 minutes and maintained at this temperature for 1 hour 30 minutes. After mould release, the plate is subjected to an additional heat treatment for 15 hours at 200° C. The test pieces obtained have, at 25° C., a flexural strength of 20 kg./mm.$^2$ for a span of 25.4 mm. After heating at 250° C. for 1465 hours, the flexural strength has retained 67% of its initial value.

EXAMPLE 4

78.4 g. of maleic N,N'-4,4'-diphenylmethane-bis-imide are added to 21.7 g. of bis-(4-aminophenyl)methane previously heated to 130° C. The mixture is stirred and is then maintained at 130° C. for 30 minutes. After cooling and grinding, 93.1 g. of the product obtained are dissolved in 106.1 g. of N-methylpyrrolidone. 3600 cm.$^2$ of a glass fabric of the satin type which has previously undergone thermal debatching and then a treatment with γ-aminopropyltriethoxysilane are coated with 79 g. of the solution. The fabric weighs 308 g./m.$^2$. The coated fabric is dried at 90° C. for 3 hours under reduced pressure (10 mm. Hg), and then cut into 16 specimens (each 150 mm. × 150 mm.), which are stacked to form a laminated assembly. This assembly is compressed under 30 kg./cm.$^2$, and maintained under this pressure for 1 hour, the temperature gradually being raised to 200° C. After mould release, the laminate is gradually heated to 250° C. in 70 hours. After cooling (to 25° C.), it has the following properties:

Resin content—20.9%

Flexural strength (for a span of 50 mm.):

Initial—65 kg./mm.$^2$

After 232 hours at 250° C.—74 kg./mm.$^2$

EXAMPLE 5

The procedure of Example 1 is followed with 90.2 g. of the same bis-imide and 9.8 g. of the same diamine preheated at 150° C., the mixture being heated at 150° C. for 5 minutes. Moulding is then effected by casting in accordance with Example 3(b). An additional heat treatment is carried out at 230° C. for 50 hours. The test pieces have, at 25° C., a flexural strength of 13.3 kg./mm.$^2$; after 169 hours at 300° C., it is still 9.5 kg./mm.$^2$.

EXAMPLE 6

45.15 g. of maleic N,N'-4,4'-diphenylphenylmethane-bis-imide are intimately mixed with 9.90 g. of bis-(4-aminophenyl)methane. 10 g. of this mixture are heated at 200° C. for 5 minutes. After cooling, the prepolymer is ground and place in a mould identical to that employed in Example 1. The mould is heated to 195° C. under a pressure of 25 kg./cm.$^2$ and then maintained for 1 hour at 195°-205° C. under a pressure of 100 kg./cm.$^2$. After mould release and cooling, the moulded bar has, at 25° C., a flexural strength of 8.6 kg./mm.$^2$ (for a span of 25.4 mm.).

EXAMPLE 7

The procedure of Example 6 is followed using 48.24 g. of maleic N,N'-metaphenylene-bis-imide and 12 g. of bis-(4-aminophenyl)-ether. The mould is heated to 195° C. in 35 minutes under a low pressure (called the contact pressure) and then maintained at 195°-200° C. for 1 hour under 100 kg./cm.$^2$. The flexural strength of the bar is 12.2 kg./mm.$^2$.

EXAMPLE 8

The procedure of Example 6 is followed using 64.3 g. of maleic N,N'-metaphenylene-bis-imide and 15.8 g. of bis-(4-aminophenyl)methane. The moulded article has a flexural strength of 12 kg./mm.$^2$.

EXAMPLE 9

The experiment described in Example 6 is repeated, using 32.4 g. of maleic N,N'-4,4'-diphenylether-bis-imide, and 6 g. of bis-(4-aminophenyl)ether. The mould is heated to 180° C. in 20 minutes under 25 kg./cm.$^2$ and then from 180° to 210° C. in 1 hour under 100 kg./cm.$^2$. The bar has a flexural strength of 10 kg./mm.$^2$.

EXAMPLE 10

41.3 g. of maleic N,N'-4,4'-diphenylmethane-bis-imide are added to 9.4 g. of 1,1-bis-(4-aminophenyl)cyclohexane previously heated to 130° C. The mixture is stirred and then maintained at 130° C. for 1 hour, 30 minutes. After cooling and grinding, 25 g. of the powder obtained are introduced into a cylindrical mould having an internal diameter of 75 mm. The mould is heated to 110° C. under a pressure of 100 kg./cm.$^2$ and then heated to 220° C. in 1 hour under the same pressure. After mould release and cooling, the article formed is heated at 250° C. for 272 hours. It then has at 25° C., a flexural strength of 12.4 kg./mm.$^2$ (for a span of 25.4 mm.).

EXAMPLE 11

A procedure similar to that described in Example 10 is followed with 19.6 g. of maleic N,N'-4,4'-diphenylmethane-bis-imide and 5.36 g. of 1,1-bis-(4-amino-3-methylphenyl)cyclohexane. The moulding is effected on the whole of the powder obtained, the mould being heated to 130° C. under 100 kg./cm.$^2$, and the temperature is then raised to 230° C. in 1 hour under this pressure. After mould release, the article is heated at 250° C. for 96 hours. After cooling, it has a flexural strength of 14.2 kg./mm.$^2$ (for a span of 25.4 mm.).

EXAMPLE 12

Into 67 g. of N-methylpyrrolidone heated at 130° C. are introduced 21.68 g. of bis-(4-aminophenyl)methane and 78.32 g. of maleic N,N'-4,4'-diphenylmethane-bis-imide. The mixture is stirred and then maintained at 130° C. for 15 minutes. After rapid cooling, a portion of the solution obtained is employed to prepare a laminate by the process described in Example 4. The compression is effected under 15 kg./cm.$^2$ at 180° C., and the mould is subsequently heated to 250° C. in 1 hour under this pressure. After mould release, the laminate is heated at 200° C. for 49 hours and then 250° C. for 47 hours. After cooling, it has, at 25° C., the following characteristics:

Resin content—20.9%

Flexural strength (for a span of 50 mm.):

Initial—59.5 kg./mm.$^2$

After 2000 hours at 250° C.—35 kg./mm.$^2$

We claim:

1. A cross-linked resin obtained by heating at 100° C. to 350° C. an unsaturated bis-imide selected from the group consisting of maleic N,N'-ethylene-bis-imide, maleic N,N'-hexamethylene-bis-imide, maleic N,N'-metaphenylene-bis-imide, maleic N,N'-paraphenylene-bis-imide, maleic N,N'-4,4'-diphenylmethane-bis-imide, maleic N,N'-4,4'-diphenylether-bis-imide, maleic N,N'-4,4'-diphenylsulphone-bis-imide, maleic N,N'-4,4'-dicyclohexylmethane-bis-imide, maleic N,N'-α,α'-4,4'-dimethylenecyclohexane-bis-imide, maleic N,N'-metaxylylene-bis-imide and maleic N,N'-4,4'-diphenylcyclohexane-bis-imide with a diamine selected from the group consisting of 4,4'-diaminodicyclohexylmethane, 1,4-diaminocyclohexane, 2,6-diaminopyridine, metaphenylenediamine, paraphenylenediamine, 4,4'-diaminadiphenylmethane, 2,2-bis-(4-aminophenyl)-propane, benzidine, 4,4'-diaminophenyl oxide, 4,4'-diaminodiphenyl sulphide, 4,4'-diaminodiphenyl-sulphone, bis-(4-aminophenyl)diphenylsilane, bis-(4-aminophenyl)methylphosphine oxide, bis-(3-aminophenyl)methylphosphine oxide, bis-(4-aminophenyl)phenylphosphine oxide, bis-(4-aminophenyl)phenylamine, 1,5-diamino-naphthalene, metaxylylenediamine, paraxylene diamine, 1,1-bis-(-paraaminophenyl)phthalene, 1,1-bis-(4-aminophenyl)cyclohexane, 1,1-bis(4-amino-3-methylphenyl)cyclohexane and hexamethylenediamine at a ratio of bis-imide to diamine of from 1.2:1 to 50:1.

2. The cross-linked resin of claim 1 wherein said unsaturated bis-imide is maleic N,N'-4,4'-diphenylmethane-bis-imide and said diamine is bis-(4-aminophenyl)methane.

3. The cross-linked resin of claim 1 wherein the ratio of bis-imide to diamine is from 1.3:1 to 5:1.

4. The cross-linked resin of claim 2 wherein the ratio of bis-imide to diamine is from 1.3:1 to 5:1.

5. The cross-linked resin of claim 2 wherein the ratio of bis-imide to diamine is from about 2.3 to about 3.6.

*6. A resinous polymer soluble in inert polar organic solvent and containing amine and imide groups formed by reacting a bis-maleimide with a diprimary amine in a molar ratio of from 1.2:1 to 50:1 at a temperature of from about 100° C. to about 250° C.*

*7. The resinous polymer of claim 6 wherein the bis-maleimide is maleic N,N'-4,4'-diphenylmethane-bis-imide and said diprimary amine is bis-(4-aminophenyl)methane.*

*8. The resinous polymer of claim 6 wherein the ratio of bis-imide to diamine is from 1.3:1 to 5:1.*

*9. A lacquer comprising the resinous polymer of claim 6 in solution in an inert polar organic solvent.*

*10. The lacquer of claim 9 in which said solvent is selected from the group of dimethyl formamide, dimethylacetamide and N-methyl pyrrolidone.*

*11. A method for curing the resinous polymer of claim 6 wherein the said polymer is heated up to a temperature of about 350° C.*

*12. A resinous polymer soluble in inert polar organic solvent and containing amine and imide groups formed by reacting a bis-maleimide with a diprimary amine in a molar ratio between 1.2 to 1 and 50:1, said reaction being carried out in solution in an inert polar organic solvent at a temperature of 100° to 250° C.*

*13. A polymer as recited in claim 12 in which the ratio of said bis-maleimide to said diprimary amine is from 1.3:1 to 5:1.*

*14. A polymer as recited in claim 12 in which said maleimide is based on maleic anhydride.*

*15. A polymer as recited in claim 12 in which said diprimary amine is aromatic.*

*16. A polymer as recited in claim 12 in which the temperature of reaction is 150° C.*

*17. A lacquer comprising the polymer of claim 12 in solution in an inert polar organic solvent.*

*18. A method of forming a resinous polymer soluble in an inert polar organic solvent and containing amine and imide groups comprising reacting a bis-maleimide with a diprimary amine in a molar ratio of from 1.2:1 to 50:1 in an inert polar organic solvent medium at a temperature of 100° to 250° C.*

*19. A lacquer comprising a resinous polymer soluble in inert polar organic solvent and containing amine and imide groups formed by reacting a bis-maleimide with a diprimary amine in a molar ratio between 1.2:1 and 50:1, said reaction being carried out in solution in inert polar organic solvent at a temperature of 100° to 250° C., said resinous polymer being in solution in an inert polar organic solvent selected from the group of dimethyl formamide, dimethylacetamide and N-methyl pyrrolidone.*

*20. A resinous moulded polymer soluble in polar organic solvent and containing amine and imide groups formed by reacting a bis-maleimide with a diprimary amine in a molar ratio of from 1.2:1 to 50:1 at a temperature of from about 100° C. to about 250° C.*

*21. The product of the process as defined by claim 11.*

* * * * *